United States Patent [19]
Sasaki

[11] Patent Number: 5,390,160
[45] Date of Patent: Feb. 14, 1995

[54] OPTICAL INFORMATION RECORDING AND REPRODUCING APPARATUS AND METHOD FOR DETECTING CONTAMINATION OF OPTICAL APPARATUS

[75] Inventor: Kenichi Sasaki, Tokyo, Japan

[73] Assignee: Canon Kabushiki Kaisha, Tokyo, Japan

[21] Appl. No.: 22,598

[22] Filed: Feb. 18, 1993

Related U.S. Application Data

[63] Continuation of Ser. No. 356,516, May 25, 1989, abandoned.

[30] Foreign Application Priority Data

May 27, 1988 [JP] Japan ................................ 63-128217

[51] Int. Cl.6 ................................................ G11B 3/90
[52] U.S. Cl. .................................... 369/54; 369/58
[58] Field of Search ............... 369/44.32, 44.33, 44.11, 369/124, 58, 54, 44.25, 44.42, 116, 70, 125, 71, 72; 250/205, 201.5; 356/127, 6

[56] References Cited

U.S. PATENT DOCUMENTS

| | | | |
|---|---|---|---|
| 3,696,344 | 10/1972 | Feinleib et al. | 365/174 |
| 4,051,329 | 9/1977 | Blondet et al. | 369/116 |
| 4,322,838 | 3/1982 | Neumann | 369/44.11 |
| 4,507,766 | 3/1985 | Saimi et al. | 369/44.42 |
| 4,616,356 | 10/1986 | Wilkinson et al. | 369/116 |
| 4,627,725 | 12/1986 | Nishio et al. | 369/44.41 |
| 4,771,412 | 9/1988 | Aihara et al. | 369/75.1 |
| 4,799,210 | 1/1989 | Wilson et al. | 250/205 |
| 4,856,011 | 8/1989 | Shimada et al. | 250/205 |
| 4,927,266 | 5/1990 | Sugiura et al. | 250/205 |
| 4,937,441 | 6/1990 | Ishizawa et al. | 250/205 |

FOREIGN PATENT DOCUMENTS

| | | | |
|---|---|---|---|
| 61-04338 | 5/1986 | Japan | 369/44.32 |
| 62-204441 | 9/1987 | Japan | 369/44.32 |
| 63-90036 | 4/1988 | Japan | 369/44.32 |

*Primary Examiner*—Aristotelis Psitos
*Assistant Examiner*—Nabil Hindi
*Attorney, Agent, or Firm*—Fitzpatrick, Cella, Harper & Scinto

[57] ABSTRACT

An optical information recording/reproducing apparatus which can prevent an optical system from being impossible to use due to its contamination, and in which an optical system need not be cleaned in case that it is not contaminated.

The apparatus includes a contamination detection device for detecting contamination of an optical system of the optical information recording/reproducing apparatus. The contamination detection device includes a light source, a first detector for monitoring an output of a light beam emitted from the light source, an optical system for focusing the light beam emitted from said light source on an information recording medium, a second detector for receiving the light beam emitted from said light source and passing through said optical system and a processing device for comparing outputs from said first and second detectors.

22 Claims, 5 Drawing Sheets

OPTICAL INFORMATION RECORDING AND REPRODUCING APPARATUS AND METHOD FOR DETECTING CONTAMINATION OF OPTICAL APPARATUS

This application is a continuation of application Ser. No. 07/356,516, filed May 25, 1989, now abandoned.

FIELD OF THE INVENTION AND RELATED ART

The present invention relates to an optical information recording/reproducing apparatus for performing recording and/or reproduction of information by projecting a light beam onto an information recording medium and, more particularly to an optical information recording/reproducing apparatus which can detect contamination of an optical system arranged in the apparatus and which can prevent recording and/or reproduction of information from being disturbed.

Note that the present invention is not particularly limited to a shape of an information recording medium, and a card-, disk-, or sheet-like information recording medium, or the like may be used.

In a conventional optical information recording/reproducing apparatus, an objective lens for focusing a light beam from a light source on an information recording medium is moved in a direction of its optical axis and/or in a direction perpendicular to the above direction, thus performing auto-focus servo and auto-tracking servo operations. When the auto-focus servo and auto-tracking servo are performed, an appropriate light spot can be radiated on an information pit of the information recording medium, and information recording and/or reproduction can be accurately performed.

In the optical information recording/reproducing apparatus described above, in long-term use in a normal environment, dust may be deposited on the surface of the objective lens or it may be contaminated with the smoke of cigarettes. In the optical information recording/reproducing apparatus, since a light spot as small as a diameter of about 1 μm is formed on the medium, aberration of the objective lens must be strictly corrected. The contaminated surface of the objective lens disorders a transmission wave surface, and disturbs formation of a minute light spot. As a result, accurate information recording and/or reproduction are/is adversely influenced.

Even when a beam spot shape is not adversely influenced, a light energy after the light passes through the objective lens is decreased by the contaminated surface. For example, in an optical disk apparatus such as write once type optical disk utilizing heating of an information recording medium by a light spot or an opto-magnetic recording system and a phase change system, the temperature for recording would not be raised to the required temperature, and these functions cannot be appropriately performed.

SUMMARY OF THE INVENTION

The present invention has been made in consideration of the conventional problems, and has as its object to provide an optical information recording/reproducing apparatus which can prevent an optical system from being impossible to use due to its contamination, and in which an optical system need not be cleaned in case that it is not contaminated.

In order to achieve the above objects, there provided an optical information recording/reproducing apparatus in which a light beam emitted from a light source and passing through an optical system is radiated onto an information recording medium to perform recording and/or reproduction of information, comprising
  a light detector for receiving the light beam passing through the optical system, wherein an output from the light detector is compared with a monitor output of the light source for emitting the light beam to detect contamination of the optical system.

DETAILED DESCRIPTION OF THE PREFERRED EMBODIMENTS

An embodiment of the present invention will now be described in detail with reference to the accompanying drawings.

Figure 1:
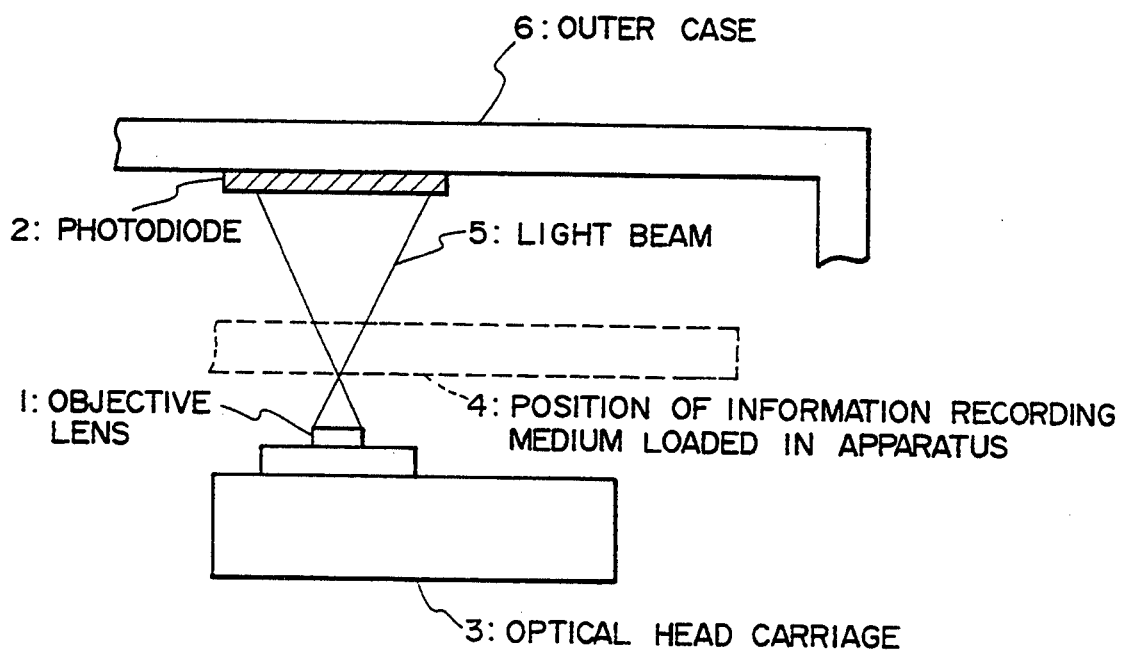
FIG. 1 is a partial sectional view showing a first embodiment of an optical information recording/reproducing apparatus according to the present invention.

FIG. 1 is a partial sectional view showing a first embodiment of an optical information recording/reproducing apparatus according to the present invention.

In FIG. 1, an objective lens 1 is held by an actuator (not shown), and focuses a light beam emitted from a light source (not shown) onto an information recording medium. A photodiode 2 as a detector measures the intensity of the light beam passing through the objective lens. The photodiode is fixed on an inner wall of an outer case 6 or a support member such as an internal structure of the optical information recording/reproducing apparatus. An optical head carriage 3 is movably supported by a moving means (not shown).

In FIG. 1, a position of an information recording medium loaded in the apparatus is indicated by "4", and a light beam upon measurement of an intensity of the light beam passing through the objective lens (i.e., when no information recording medium is loaded in the apparatus in this embodiment) is indicated by "5".

The optical head carriage 3 is provided with a light detector, used for recording and/or reproduction of information, for receiving a light beam reflected by the information recording medium and passing through the objective lens 1, an optical system for guiding a light beam reflected by the information recording medium and passing through the objective lens 1 toward the light detector, and the like.

As shown in FIG. 1, the position of the optical head carriage 3 at the time of measurement is determined, and when no information recording medium is loaded in the apparatus, the photodiode 2 is arranged and fixed to a portion in the apparatus where the light beam 5, emitted from the light source and passing through the objective lens 1, reaches. Based on an output from the photodiode 2, the presence/absence of the information recording medium in the apparatus upon contamination measurement is determined and the intensity of the light beam passing through the objective lens 1 is measured.

The present invention will be described in more detail hereinafter.

When the surface of the objective lens is contaminated, a light beam passing through the objective lens is absorbed and scattered by the contamination, and its light amount is decreased. In this embodiment, a mode for measuring the amount of the light beam passing through the objective lens is set when no information recording medium is loaded. On the basis of light amount data at that time, the contamination state of the objective lens is determined. If it is determined that the contamination exceeds an upper limit, the user is informed of this state by such means as, e.g., a lamp provided to the apparatus, a buzzer, or the like. When it is determined that the contamination exceeds the upper limit, a signal is supplied to a host computer to display a cleaning message.

The measurement can be completed within a short period of time without adversely influencing actual use of the apparatus. The measurement need only be performed once per power ON-OFF cycle.

More specifically, the measurement is performed by utilizing the time immediately after a power switch of the apparatus is turned on. When an optical head is located at a predetermined position, a laser diode of the light source is turned on during a short period, and a light beam emitted from the laser diode is detected by the detector arranged at a position in the apparatus where the light beam reaches when no information recording medium is loaded in the apparatus. When the medium is loaded in the apparatus, the light beam is blocked by the medium and cannot reach the detector. Therefore, the presence/absence of the medium can be determined on the basis of the output from the detector. If the presence of the medium is detected, the medium is temporarily discharged from the apparatus, and the measurement is performed.

Figure 2:
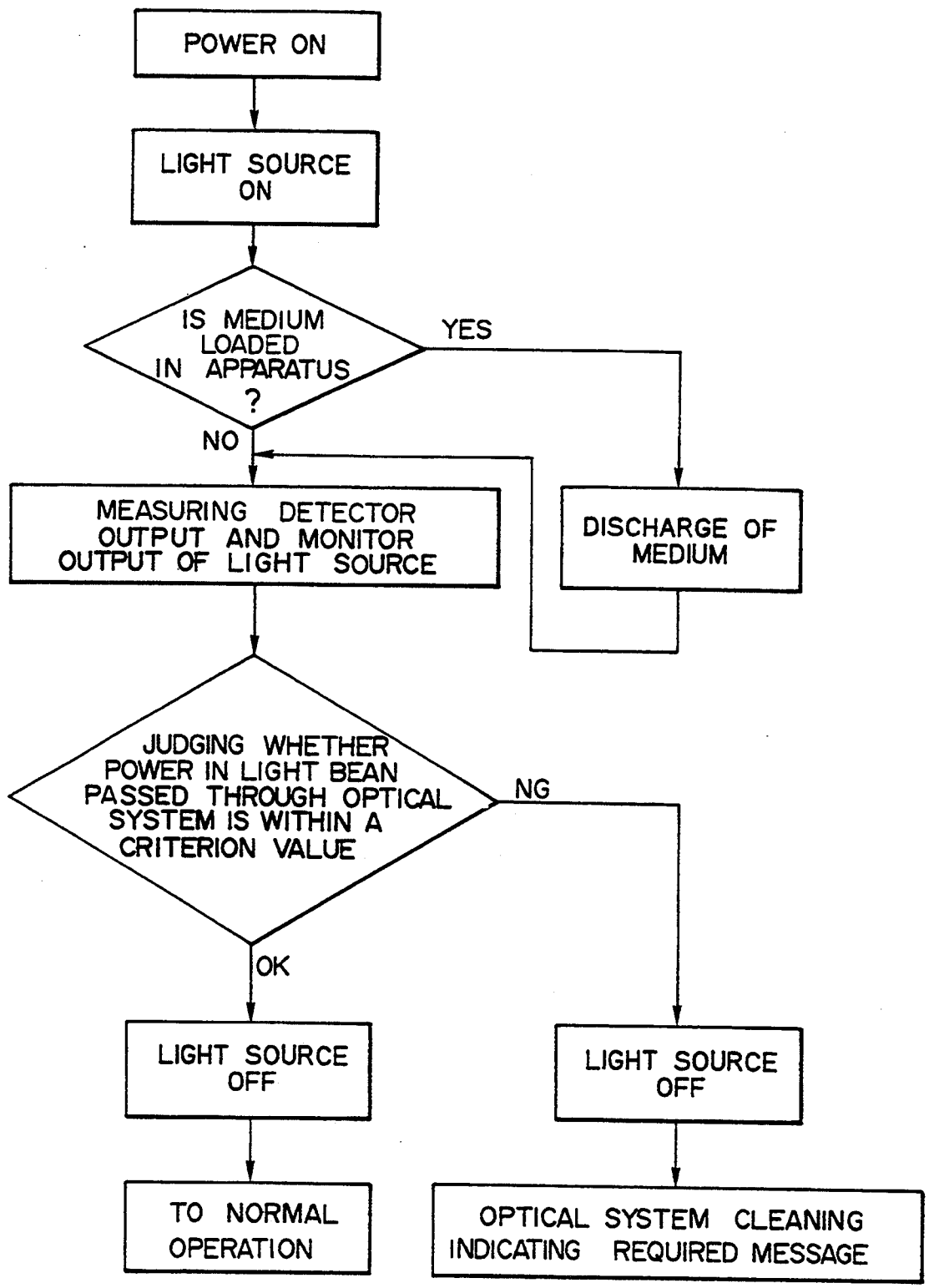
FIGS. 2 and 5 are flow charts of examples of operations for determining contamination of an optical system according to the present invention.

FIG. 2 shows a flow chart of a series of determining operations.

Figure 3:
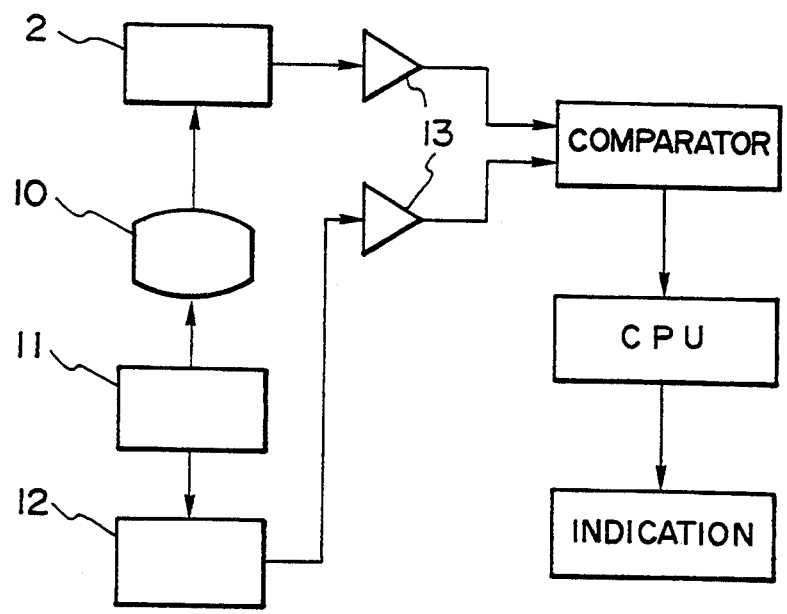
FIG. 3 is a block diagram showing a system for determining contamination of the optical system according to the present invention.

Comparison between a measurement value of a light beam passing through an optical system such as the objective lens and a monitor valve of the light beam emitted from the light source shown in FIG. 2 can be performed by, e.g., a system shown in FIG. 3. In this case, a semiconductor laser is used as the light source.

In FIG. 3, the detector 2 is used for detecting contamination of an optical system, and detects an output of a light beam emitted from a light source 11 and passing through an optical system 10 such as an objective lens. An output from the light source is monitored by a detector 12 for monitoring an output from the semiconductor laser as a light source. The outputs from the two detectors are supplied to a comparator through a preamplifier 13. A comparison result is determined by a CPU as a processing means, and the determining result is outputs to an indication (display) means of the apparatus.

The output of the semiconductor laser is monitored by a method of receiving some light beam components (rear beam) which do not propagate toward the optical system by a monitor detector, a method of receiving some light beam components (front beam) which propagate toward the optical system by the monitor detector, or the like. When the output is monitored using the front beam, light beam components which do not propagate toward the objective lens, i.e., do not pass through the objective lens, are received by the monitor detector.

When the apparatus is powered, the light source is turned on. When no information recording medium is loaded in the apparatus, the light beam from the light source is detected by the detector arranged at the position in the apparatus where the light beam, emitted from the light source and passing through the optical system, reaches. When the medium is kept loaded in the apparatus, the light beam is blocked by the medium and cannot reach the detector. Therefore, based on the output from the detector, the presence/absence of the medium can be determined. When the presence of the medium is detected, the medium is temporarily discharged from the apparatus to perform measurement.

The amount of light beam passing through the optical system such as the objective lens is measured by the detector, and the monitor output from the light source is measured. The measurement results are compared by the processing means to determine contamination of the optical system. If it is determined that the optical system is contaminated, the light source is turned off, and a signal is supplied to the host computer to display a cleaning message. If it is determined that the optical system is not contaminated, the light source is turned off, and the medium is loaded in the apparatus to perform a normal operation, e.g., recording and/or reproduction of information.

When determination of contamination of the optical system is performed by the processing means, data representing a relationship between a monitor output of the light source and an output from the detector of the light beam passing through the optical system when the optical system is not contaminated is measured and stored upon manufacture of the apparatus, adjustment of the apparatus, or the like. As the actually measured output of the detector of the light beam passing through the optical system is smaller than an output of the detector of the light beam passing through the optical system which is estimated on the basis of the monitor output and the data in the non-contamination state, it is determined that transmittance of the optical system is decreased. A change in transmittance caused by contamination of the optical system is detected, and when the transmittance is decreased, it is determined that the optical system is contaminated.

As described above, according to the optical information recording/reproducing apparatus of the present invention, a contamination state of the optical system such as the objective lens can be detected at a proper time, and the apparatus can be prevented from being impossible to use due to contamination of the optical system.

Since a contamination state of the optical system differs depending on environments, the optical information recording/reproducing apparatus of the present invention can prevent a wasteful operation that the optical system must be periodically cleaned although it is not contaminated.

In the above embodiment, the detector for detecting contamination of the optical system is arranged in an outer case of the apparatus. The detector can also serve as a detector for recording and/or reproducing information or a detector for controlling auto-focus servo and/or auto-tracking servo operations. Such embodiments will be described below.

Figure 4:
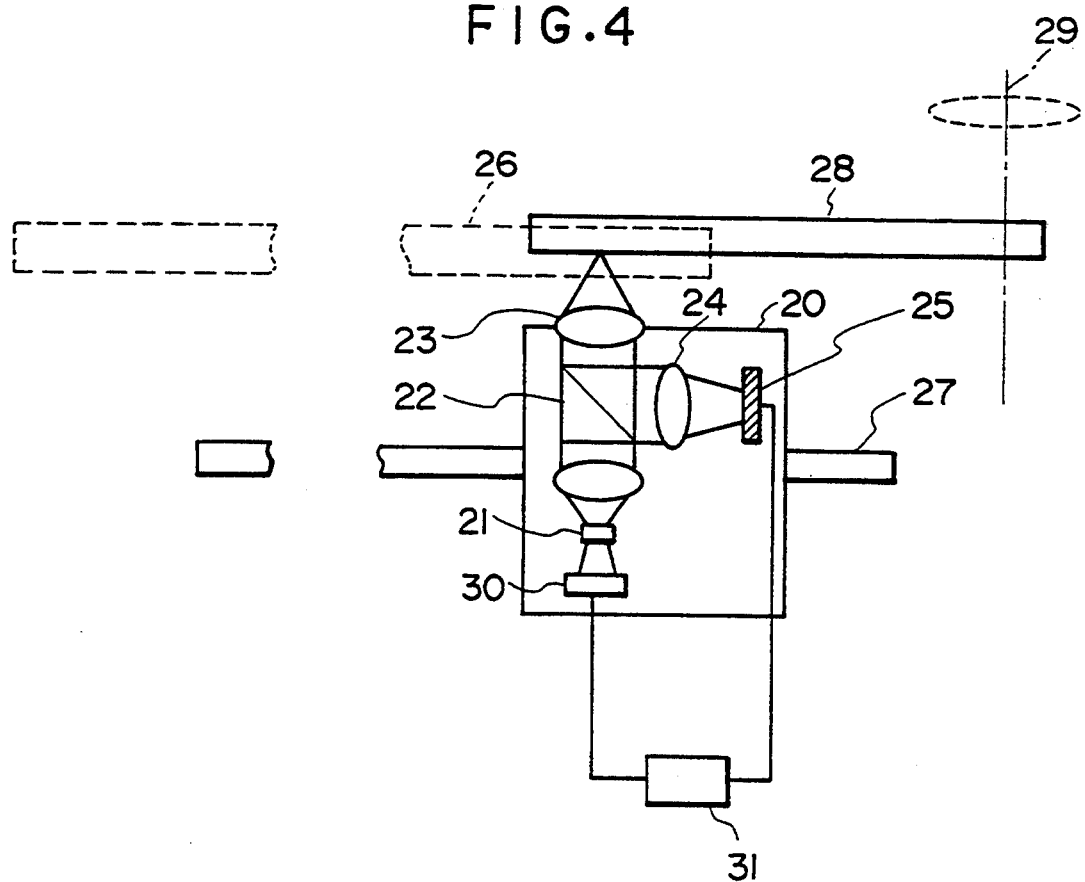
FIGS. 4, 6, and 7 are views showing other embodiments of an optical information recording/reproducing apparatus according to the present invention.

FIG. 4 shows a second embodiment of an optical information recording/reproducing apparatus of the present invention.

In FIG. 4, an optical head carriage 20 includes a light source 21 (e.g., a semiconductor laser), a beam splitter 22, an objective lens 23, a sensor lens 24, and a sensor 25 for detecting servo-and information signals. When an information recording medium 26 is loaded into the apparatus, a light beam emitted from the light source 21 propagates through the beam splitter 22 and the objective lens 23, is reflected by the medium 26, propagates again through the objective lens 23 and the beam splitter 22, is focused by the sensor lens 24, and then reaches the sensor 25. Note that the medium 26 is located at the dotted position when it is loaded in the apparatus. The optical head carriage 20 is movable along a rail 27. In FIG. 4, the carriage 20 is located at the end of the medium 26, and for example, this position is determined as a home position of the carriage. The carriage is always returned to the home position except for recording and/or reproduction of information. A standard reflecting plate 28 has a precisely constant reflectance, and is pivotable about an axis 29 by a driving mechanism (not shown). Of course, the reflecting plate 28 may be moved parallel. When the optical head carriage 20 is located at the home position and no medium 26 is loaded, the reflecting plate 28 can be moved to a position above the objective lens 23. A distance between the reflecting plate 28 and the objective lens 23 is held to be almost equal to a distance between the objective lens 23 and an information recording surface of the medium when it is loaded in the apparatus. A sensor 30 monitors an output from the light source 21 (e.g., a semiconductor laser). A CPU 31 as a processing means compares the outputs from the sensors 25 and 30.

Figure 5:
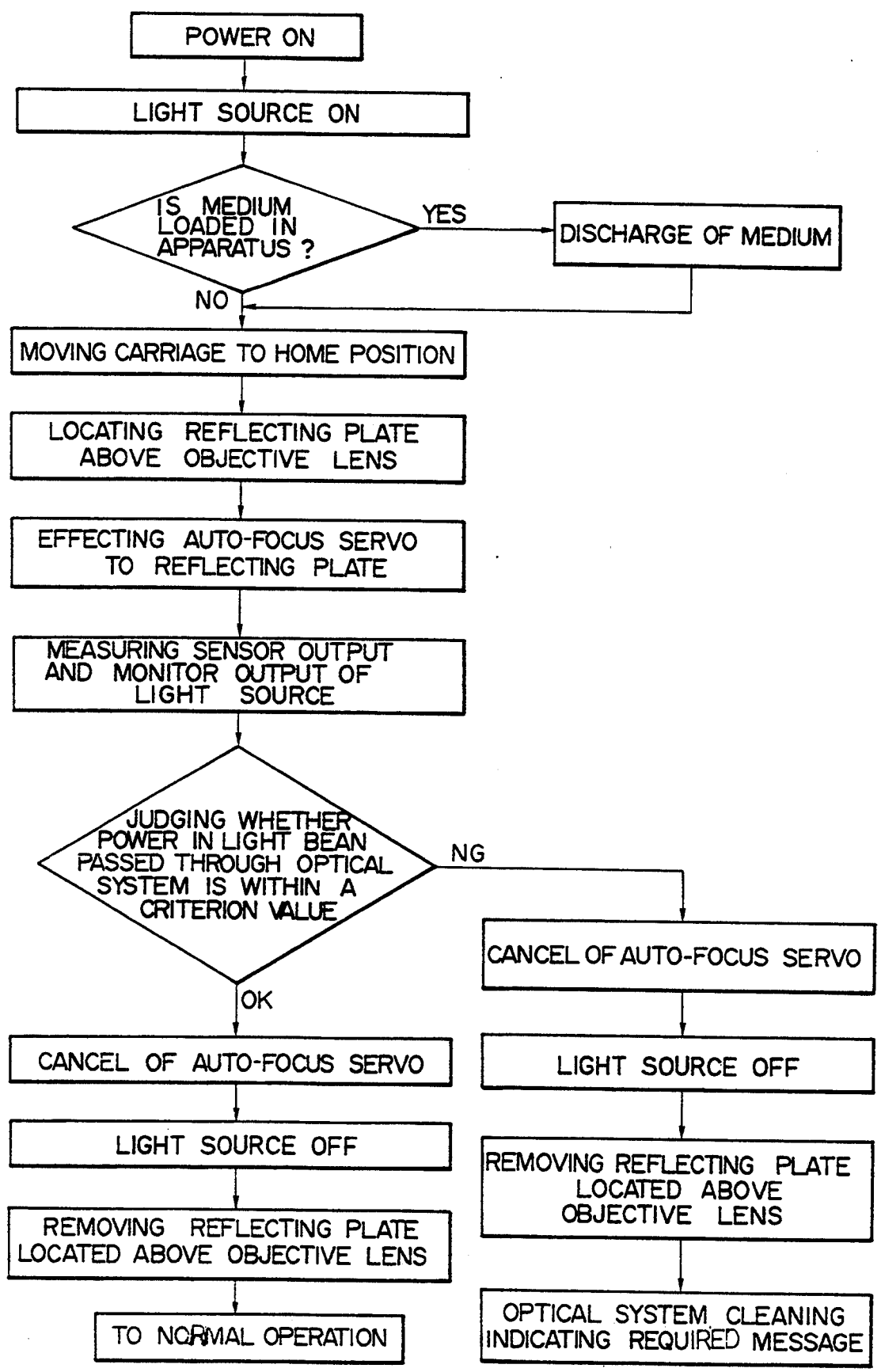

FIG. 5 shows a flow chart of an operation for determined contamination of an optical system in the optical information recording/reproducing apparatus shown in FIG. 4.

When the apparatus is powered, the light source 21 is turned on. When no information recording medium 26 is loaded in the apparatus, a light beam emitted from the light source 21 and passing through the objective lens 23 is not returned to the sensor 25. When the information recording medium 26 is present in the apparatus, the light beam emitted from the light source 21 and passing through the objective lens 23 is reflected by the medium 26, again passes through the objective lens 23, and reaches the sensor 25. The presence/absence of the medium can be judged on the basis of the output from the sensor 25. When the medium is present in the apparatus, the medium is temporarily discharged from the apparatus. The carriage 20 is moved to the home position, and the reflecting plate 28 is pivoted to be located above the objective lens 23. An auto-focus servo operation is effected to the reflecting plate 28 by an auto-focus servo mechanism (not shown).

The amount of light beam passed through the optical system constituted by the beam splitter 22, the objective lens 23, the sensor lens 24, and the like is measured by the sensor 25. The monitor output from the light source 21 is measured by the sensor 30. The two measurement results are compared by the processing means 31 determine contamination of the optical system. If it is determined that the optical system is contaminated, the auto-focus servo operation is cancelled, the light source 21 is turned off, the reflecting plate 28 located above the objective lens 23 is pivoted to be removed, and a signal is supplied to a host computer to display a cleaning message. If it is determined that the optical system is not contaminated, the auto-focus servo is cancelled, the light source 21 is turned off, the reflecting plate 28 located above the objective lens 23 is pivoted to be removed, and the medium is loaded in the apparatus to perform a normal operation such as recording and/or reproduction of information.

It is preferable that the reflecting plate 28 preferably has substantially the same reflectivity as that of the information recording medium 26 used in the apparatus. If the reflectivity of the reflecting plate 28 is largely different from that of the medium 26, a load on the sensor 25, a circuit connected to the sensor 25, and the like is increased. The reflectivity of the reflecting plate 28 must be maintained for a long period of time. In order to prevent a decrease in reflectivity due to contamination of the reflecting plate 28, the reflecting plate 28 is preferably stored in a cover or a case so as not to be exposed in the apparatus except that when it is used.

In the flow chart of FIG. 5, the auto-focus servo is effected to the reflecting plate to measure the light amount of the light beam passing through the optical system. This is to accurately measure the reflected light amount.

In the second embodiment described above, contamination of the optical system can be detected with higher accuracy than that in the first embodiment. A decrease in detection signal level caused by contamination of the optical system occurs due to not only contamination of an optical path extending from the light source to the medium, i.e., a forward optical path but also contamination of an optical path on which the light beam reflected by the medium reaches the detector for detecting the servo and information signals, i.e., a backward optical path. Since contamination is determined using the detector which is used for actually detecting a signal, a determination can be made under the same condition as that in actual use.

Figure 6:
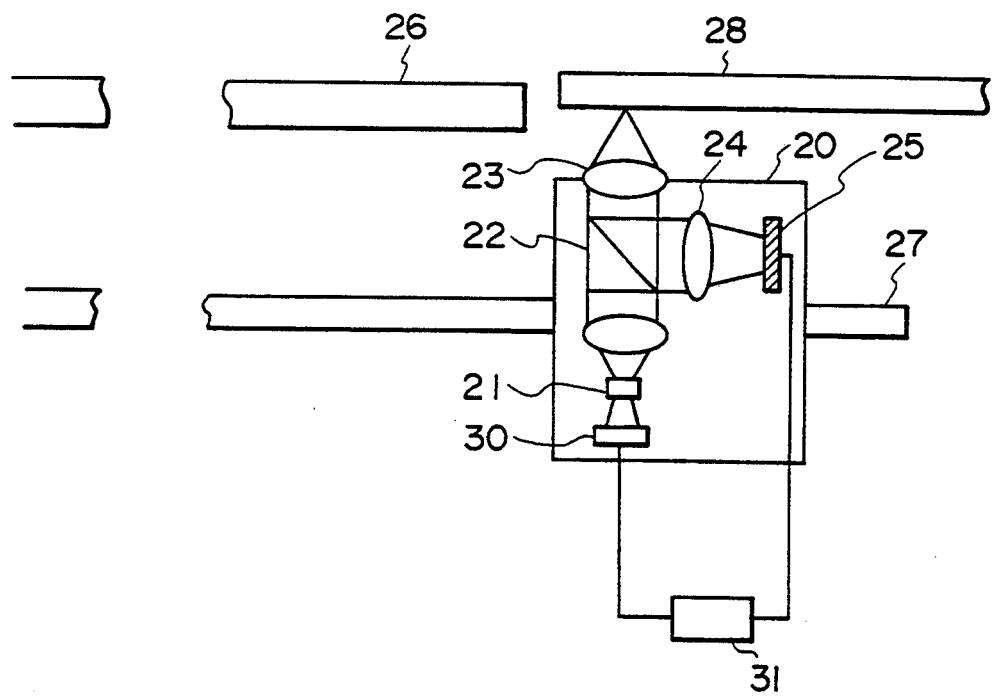

In the first and second embodiments, when the medium is present in the apparatus, the medium is temporarily discharged from the apparatus to determine contamination. However, such an arrangement need not always be employed. For example, as shown in FIG. 6, the reflecting plate 28 is arranged at a position so as not to interfere with the medium 26, and the optical head carriage 20 is moved to the position of the reflecting plate 28 to determine contamination of the optical system. In this case, the reflecting plate may be fixed in position.

Figure 7:
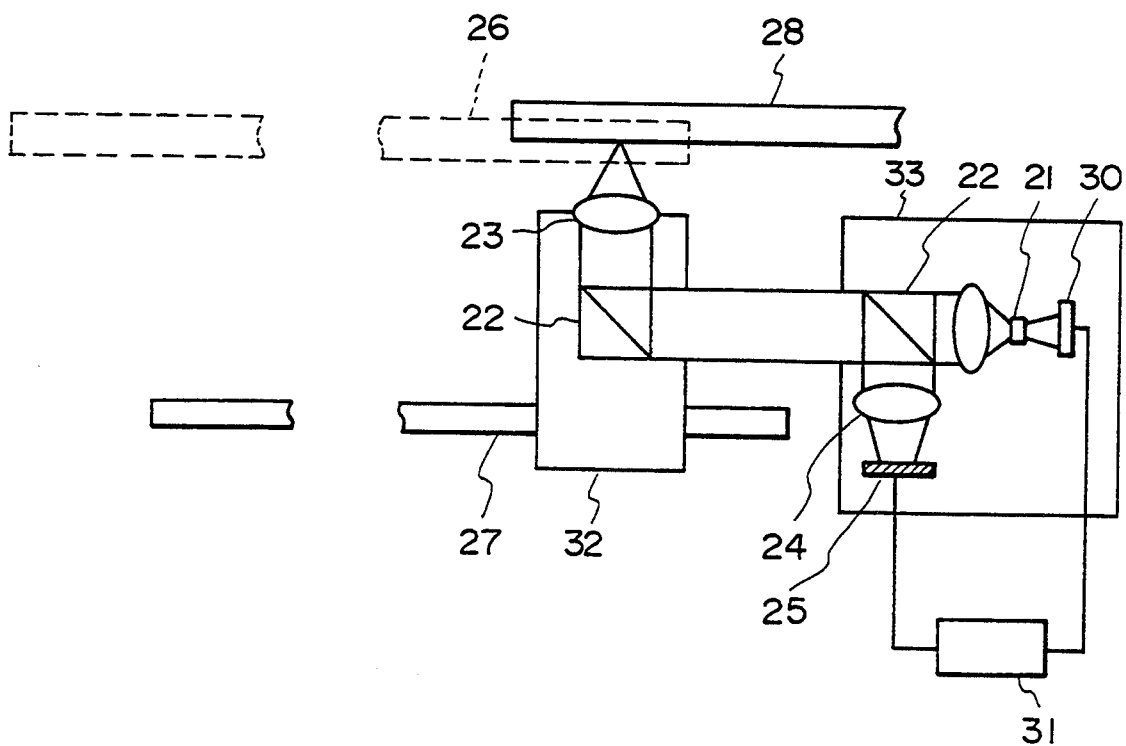

FIG. 7 shows still another embodiment of an optical information recording/reproducing apparatus of the present invention. The embodiment shown in FIG. 7 employs a separation type arrangement in which an optical system constituting the optical head in the embodiment shown in FIG. 4 is constituted by a movable portion 32 and a stationary portion 33. As compared to an integrated optical head, this arrangement is difficult to seal an optical path. Therefore, exposed surfaces of optical parts in the optical path tend to be contaminated. Therefore, the present invention is particularly effective for this arrangement.

Contamination to the optical system depends on the arrangement of the optical system of the optical head. As described in the above embodiments, if the optical head is arranged such that a light beam is radiated from the lower direction to the information recording medium, i.e., in a direction opposite to a direction of a gravitational acceleration, the surface exposed upward of an objective lens tends to be contaminated. Therefore, the present invention is particularly effective for this arrangement.

Contamination to the optical system depends on the environment of the apparatus. In particular, when outer air is introduced into the apparatus by a cooling fan to prevent an increase in temperature in the apparatus, contamination to the optical system is promoted. Therefore, the present invention is particularly effective.

What is claimed is:

1. A contamination detection apparatus for an optical system in an optical information recording and/or reproducing apparatus, comprising:
   a light source;
   a first detector for monitoring a light beam emitted from said light source;
   an optical system for focusing the light beam emitted from said light source on an information recording medium;
   a second detector for receiving the light beam emitted from said light source and passing through said optical system;
   wherein said second detector receives the light beam which does not pass through said information recording medium,
   wherein said second detector receives the light beam emitted from said light source when the information recording medium is not loaded in the optical information recording and/or reproducing apparatus; and
   processing means for detecting the contamination of said optical system by comparing outputs from said first and second detectors.

2. A contamination detection apparatus according to claim 1, wherein said second detector is fixed to an inner wall of the optical information recording and/or reproducing apparatus or an element within the optical information recording and/or reproducing apparatus.

3. A contamination detection apparatus according to claim 1, further comprising means for determining the presence of absence of said information recording medium in the optical information recording and/or reproducing apparatus by the output of said second detector.

4. A contamination detection apparatus for an optical system in an optical information recording and/or reproducing apparatus, comprising:
   a light source;
   a first detector for monitoring a light beam emitted from said light source;
   an optical system for focusing the light beam emitted from said light source on an information recording medium;
   a reflecting member for reflecting the light beam emitted from said light source and passing through said optical system to cause the reflected light beam to again pass through said optical system;
   a second detector for receiving the light beam which is reflected by said reflecting member and which again has passed through said optical system; and
   processing means for detecting the contamination of said optical system by comparing outputs from said first and second detectors.

5. A contamination detection apparatus according to claim 4, further comprising means for determining the presence of absence of the information recording medium in the optical information recording and/or reproducing apparatus by the output of said second detector.

6. A contamination detection apparatus according to claim 4, wherein said reflecting member comprises a standard reflecting plate having a constant reflectivity.

7. A contamination detection apparatus according to claim 4, wherein said reflecting member reflects the light beam emitted from said light source when the information recording medium is not loaded in the optical information recording and/or reproducing apparatus.

8. A contamination detection apparatus for an optical system in an optical information recording and/or reproducing apparatus, comprising:
   a light source;
   an optical system for guiding a light beam emitted from said light source to an information recording medium;
   a first detector for receiving a light beam component which is emitted from said light source and does not pass through said optical system;
   a reflecting member for reflecting the light beam emitted from said light source and passing through said optical system to cause the reflected light beam to again pass through said optical system;
   a second detector for receiving the light beam which is reflected by said reflecting member and which has again passed through said optical system; and
   processing means for detecting the contamination of said optical system by comparing outputs from said first and second detectors.

9. An apparatus according to claim 8, wherein said reflecting member is movable.

10. A contamination detection apparatus according to claim 8, further comprising means for determining the presence or absence of the information recording medium in the optical information recording and/or reproducing apparatus by the output of said second detector.

11. A contamination detection apparatus according to claim 8, wherein said reflecting member comprises a standard reflecting plate having a constant reflectivity.

12. A contamination detection apparatus according to claim 8, wherein said reflecting member reflects the light beam emitted from said light source when the information recording medium is not loaded in the optical information recording and/or reproducing apparatus.

13. An optical information recording and/or reproducing apparatus comprising:
   a light source;
   a first detector for monitoring a light beam emitted from said light source;
   a first optical system for guiding the light beam emitted from said light source to an information recording medium;
   a second detector for receiving the light beam from said information recording medium;
   a second optical system for guiding the light beam from said information recording medium to said second detector;
   a reflecting member for reflecting the light beam emitted from said light source and passing through said first optical system to cause the reflected light beam to again pass through said first optical system;
   a third detector for receiving the light beam reflected by said reflecting member and again passed through said first optical system;
   a third optical system for guiding the light beam reflected by said reflecting member and again passed through said first optical system to said third detector; and processing means for detecting the contamination of said optical system by comparing outputs from said first and third detectors.

14. An apparatus according to claim 13, wherein said reflecting member is movable.

15. An optical information recording and/or reproducing apparatus according to claim 13, wherein said reflecting member comprises a standard reflecting plate having a constant reflectivity.

16. A contamination detection apparatus of an optical system in an optical information recording and/or reproducing apparatus, comprising:

a light source;

an optical system for converging a light beam from said light source onto an information recording medium; and detector means for receiving and detecting the light passing through said optical system and which does not pass through the information recording medium, and for producing an output indicating the contamination state of the optical system by comparing a detection result with a predetermined signal representing light emitted from said light source which does not pass through said optical system, wherein said detector means also receives the light emerging from said light source in the event the information recording medium is not loaded in the optical information recording and/or reproducing apparatus.

17. A contamination detection apparatus according to claim 16, wherein said detector means is fixed to an inner wall of the optical information recording and/or reproducing apparatus or an element within the optical information recording and/or reproducing apparatus.

18. A contamination detection apparatus according to claim 16, wherein the output from said detector means indicates the presence or absence of the information recording medium in the optical information recording and/or reproducing apparatus.

19. An optical information recording and/or reproducing apparatus, comprising:

a light source;

an optical system for converging a light beam from said light source onto an information recording medium; and detector means for receiving and detecting the light beam passing through and emerging from said optical system, wherein in the event the information recording medium is not loaded in the apparatus, said detector means receives the light beam emitted from said light source so as to produce an output indicating the contamination state of said optical system by comparing a detection result with a predetermined signal representing light emitted from said light source which does not pass through said optical system.

20. A method for detecting the contamination of an optical system in an optical information recording and-/or reproducing apparatus, said method comprising the steps of:

monitoring a light beam emitted from a light source with a first detector;

guiding the light beam emitted from said light source to an optical system;

receiving the light beam emitted from the light source when the information recording medium is not loaded in the optical information recording and/or reproducing apparatus and emerging from said optical system which does not pass through an information recording medium with a second detector; and comparing the output from the first detector and the output from the second detector and determining the contamination of the optical system based upon said comparing operation.

21. A method for detecting the contamination of an optical system in an optical information recording and-/or reproducing apparatus, said method comprising the steps of:

determining the presence or absence of an information recording medium in the optical information recording and/or reproducing apparatus and ejecting the information recording medium when the information recording medium is in the optical information recording and/or reproducing apparatus;

moving a reflecting member just above the optical system for converging a light beam from a light source;

monitoring the light beam emitted from the light source with a first detector;

guiding the light beam emitted from the light source to said optical system;

receiving the light beam emerging from the optical system and reflected by the reflecting member with a second detector; and comparing the output of the first detector and the output of the second detector and determining the contamination of the optical system based upon said comparing operation.

22. A method for detecting the contamination of an optical system in an optical information recording and-/or reproducing apparatus, said method comprising the steps of:

determining the presence or absence of an information recording medium within the apparatus and ejecting the information recording medium in the event the information recording medium is detected to be present within the apparatus;

receiving a light beam which has been emitted from a light source, which has passed through the optical system, and which has not passed through the information recording medium, by use of a detector; and determining the contamination state of the optical system from an output of the detector by comparing an output of the detector with a predetermined signal representing light emitted from the light source which does not pass through the optical system.

* * * * *

UNITED STATES PATENT AND TRADEMARK OFFICE
CERTIFICATE OF CORRECTION

PATENT NO. : 5,390,160  
DATED : February 14, 1995  
INVENTOR(S) : KENICHI SASAKI It is certified that error appears in the above-indentified patent and that said Letters Patent is hereby corrected as shown below:

ON THE COVER PAGE

[56] REFERENCES CITED

FOREIGN PATENT DOCUMENTS

"61-04338   5/1986   Japan" should read
--61-104338   5/1986   Japan--.

[57] ABSTRACT

Line 12, "said" should read --the--.
Line 15, "said" should read --the-- (both occurrences).
Line 17, "said" should read --the--.

IN THE DRAWINGS

Sheet 2, Figure 2

"BEAN" should read --BEAM--.

Sheet 4, Figure 5

"BEAN" should read --BEAM--.

COLUMN 1

Line 32, "servo" should read --servo operations--.

UNITED STATES PATENT AND TRADEMARK OFFICE
CERTIFICATE OF CORRECTION

PATENT NO. : 5,390,160     Page 2 of 2
DATED : February 14, 1995
INVENTOR(S) : KENICHI SASAKI It is certified that error appears in the above-indentified patent and that said Letters Patent is hereby corrected as shown below:

COLUMN 2

Line 1, "there provided" should read --there is provided--.

COLUMN 5

Line 63, "deter-" should read --to deter- --.

COLUMN 7

Line 42, "of" (first occurrence) should read --or--.
Line 66, "of" (first occurrence) should read --or--.

Signed and Sealed this

Twentieth Day of June, 1995

Attest:

BRUCE LEHMAN

*Attesting Officer*     *Commissioner of Patents and Trademarks*